(12) United States Patent
Ritter et al.

(10) Patent No.: US 7,623,730 B2
(45) Date of Patent: Nov. 24, 2009

(54) SYSTEM AND METHOD THAT COMPENSATE FOR ROTATIONS OF TEXTURES DEFINED BY PARAMETRIC TEXTURE MAPS

(75) Inventors: Bradford A. Ritter, Fort Collins, CO (US); Ross Cunniff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1545 days.

(21) Appl. No.: 10/630,452

(22) Filed: Jul. 30, 2003

(65) Prior Publication Data

US 2005/0024374 A1    Feb. 3, 2005

(51) Int. Cl.
  G06K 9/36    (2006.01)
  G09G 5/00    (2006.01)
(52) U.S. Cl. ........................ 382/276; 345/582
(58) Field of Classification Search ............... 382/276; 345/582

See application file for complete search history.

(56) References Cited

U.S. PATENT DOCUMENTS

| | | | |
|---|---|---|---|
| 4,615,013 A * | 9/1986 | Yan et al. ............. | 345/582 |
| 5,561,756 A | 10/1996 | Miller et al. | |
| 5,748,869 A * | 5/1998 | Shioya ................ | 345/442 |
| 5,805,782 A | 9/1998 | Foran | |
| 5,841,441 A * | 11/1998 | Smith ................. | 345/587 |
| 5,880,736 A * | 3/1999 | Peercy et al. ......... | 345/426 |
| 5,943,058 A | 8/1999 | Nagy | |
| 5,973,701 A | 10/1999 | Vaswani | |
| 6,037,949 A | 3/2000 | DeRose et al. | |
| 6,078,332 A | 6/2000 | Ohazama | |
| 6,163,320 A | 12/2000 | Barcena et al. | |
| 6,169,553 B1 | 1/2001 | Fuller et al. | |
| 6,229,547 B1 | 5/2001 | Grzeszczuk | |
| 6,288,730 B1 | 9/2001 | Duluk, Jr. et al. | |
| 6,292,193 B1 * | 9/2001 | Perry et al. ........... | 345/582 |
| 6,348,917 B1 | 2/2002 | Vaswani | |
| 6,373,491 B1 * | 4/2002 | Sasaki ................ | 345/443 |
| 6,384,834 B1 * | 5/2002 | Watanabe ............ | 345/582 |
| 6,417,860 B1 | 7/2002 | Migdal et al. | |
| 6,462,747 B1 | 10/2002 | Oh | |
| 6,515,674 B1 * | 2/2003 | Gelb et al. ........... | 345/582 |
| 6,744,442 B1 * | 6/2004 | Chan et al. ........... | 345/587 |
| 6,888,544 B2 * | 5/2005 | Malzbender et al. .... | 345/423 |
| 7,030,884 B2 * | 4/2006 | Horton et al. ......... | 345/582 |
| 2005/0128213 A1 * | 6/2005 | Barenbrug et al. ..... | 345/587 |

FOREIGN PATENT DOCUMENTS

WO    WO 01/71668    9/2001

OTHER PUBLICATIONS

"Polynomial texture maps", Malzbender, Tom, et al., Proceedings of the 28th annual conference on Computer graphics and interactive techniques, Aug. 2001.*

* cited by examiner

Primary Examiner—Wenpeng Chen

(57) ABSTRACT

A texture mapping system comprises memory and a texture map manager. The memory stores a parametric texture map, and the parametric texture map has a plurality of texels. Each of the texels defines a variable expression that defines a luminosity parameter as a function of light direction. The texture map manager is configured to perform a rotation of a texture defined by the parametric texture map, and the texture map manager is further configured to adjust the variable expression of at least one of the texels to compensate for the rotation.

16 Claims, 12 Drawing Sheets

(Side View)

(Bottom View)

SYSTEM AND METHOD THAT COMPENSATE FOR ROTATIONS OF TEXTURES DEFINED BY PARAMETRIC TEXTURE MAPS

BACKGROUND OF THE INVENTION

Related Art

Texture mapping typically involves mapping a source image, referred to as a "texture," onto a surface of a graphical object. The texture is normally defined by a texture map having a plurality of point elements, referred to as "texels." Each texel comprises one or more color component values and a set of texel coordinates. Each color component value is indicative of one of the texel's color components (e.g., red, green, or blue), and the texel coordinates are indicative of the texel's position within the texture.

During texture mapping, a texture mapper receives graphical data (e.g., primitives) defining a surface of a graphical object, and the texture mapper maps the pixels of the object's surface to the texels of the texture map. In this regard, based on a pixel's coordinate values, the texture mapper maps the pixel to one or more corresponding texels of the texture map. If there is only one corresponding texel, then the texture mapper assigns the color component values of the one corresponding texel to the pixel. If there are multiple corresponding texels, then the texture mapper interpolates color component values from the color component values of the corresponding texels and then assigns the interpolated color component values to the pixel. The color component values assigned to the different pixels by the texture mapper are then utilized to color the object's surface when the object is displayed by a display device, such as a display monitor or a printer, for example. Moreover, the surface of the displayed object appears to have a texture that corresponds to the source image defined by the aforedescribed texture map.

Employing texture mapping generally facilitates the creation of more complex and realistic images. In this regard, when texture mapping techniques are employed, it is not necessary for the primitives of a graphical object to define the texture of the object's surface, thereby reducing the amount of graphical data included in the primitives. Thus, storage and processing of the primitives are generally facilitated. During rendering, a graphics adapter can take a texture map defining a small image of a complex texture and, using various techniques, such as tiling, for example, apply the texture to the surface of the graphical object such that the object's surface appears to be textured according to the source image defined by the texture map.

Indeed, utilizing conventional texture mapping techniques, graphical display systems have efficiently produced fairly realistic and complex images. However, techniques for further improving the textured appearance of graphical objects are generally desirable.

SUMMARY OF THE INVENTION

The present invention generally pertains to a texture mapping system and method that compensate for rotations of textures defined by parametric texture maps.

A texture mapping system in accordance with one embodiment of the present invention comprises memory and a texture map manager. The memory stores a parametric texture map, and the parametric texture map has a plurality of texels. Each of the texels defines a variable expression that defines a luminosity parameter as a function of light direction. The texture map manager is configured to perform a rotation of a texture defined by the parametric texture map, and the texture map manager is further configured to adjust the variable expression of at least one of the texels to compensate for the rotation.

A texture mapping method in accordance with one embodiment of the present invention comprises rotating a texture defined by a parametric texture map, the parametric texture map having a plurality of texels, each of the texels defining a variable expression that defines a luminosity parameter as a function of light direction, and compensating the variable expression of at least one of the texels for the rotating, wherein the compensating comprises adjusting the variable expression of at least one of the texels based on an angle of rotation of the texture.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Graphical display systems are often used to generate simulated images of physical objects. However, some physical objects possess certain characteristics that are difficult for a graphical display system to accurately simulate. For example, an object sometimes has a surface that does not appear to respond to changes in light directions in a homogenous fashion across the object's surface. More specifically, the luminosity of one point on an object's surface may appear to behave differently, based on light position, than the luminosity of another point on the object's surface.

For example, if a light source is positioned at an angle ($\alpha$) relative to a first point on the object's surface and is moved to an angle ($\beta$) relative to the first point, the luminosity of the first point may appear to change in a particular manner as the light source is being moved from angle ($\alpha$) to angle ($\beta$). However, if the light source is positioned at the same angle ($\alpha$) relative to a second point on the object's surface and is moved to the same angle ($\beta$) relative to the second point, the luminosity of the second point may appear to change in an entirely different manner as the light source is being moved from angle ($\alpha$) to angle ($\beta$).

Such a phenomena is not always noticeable to a viewer and is often more pronounced for less homogenous surfaces. As an example, many cloth fabrics have several different threads of different sizes and colors interwoven together and have a surface that is substantially non-homogenous. Moreover, the luminosity behavior of objects covered with such cloth material often appears to change as the position of the light source illuminating the objects changes.

Conventional texture mapping systems typically do not attempt to account for the aforedescribed phenomena when applying a texture to a surface of a graphical object. In this regard, typical texel values in a conventional texture map are constant color values and, in particular, do not account for the fact that different texels of a texture defined by the texture map may, in reality, appear to respond to light in a different manner than other texels. A texture mapping system in accordance with a preferred embodiment of the present invention, on the other hand, accounts for the phenomena that different texels of the texture defined by a texture map may appear to respond to light in a different manner as a light source is moved relative to the texels. Thus, more realistic graphical images are possible.

Figure 1:
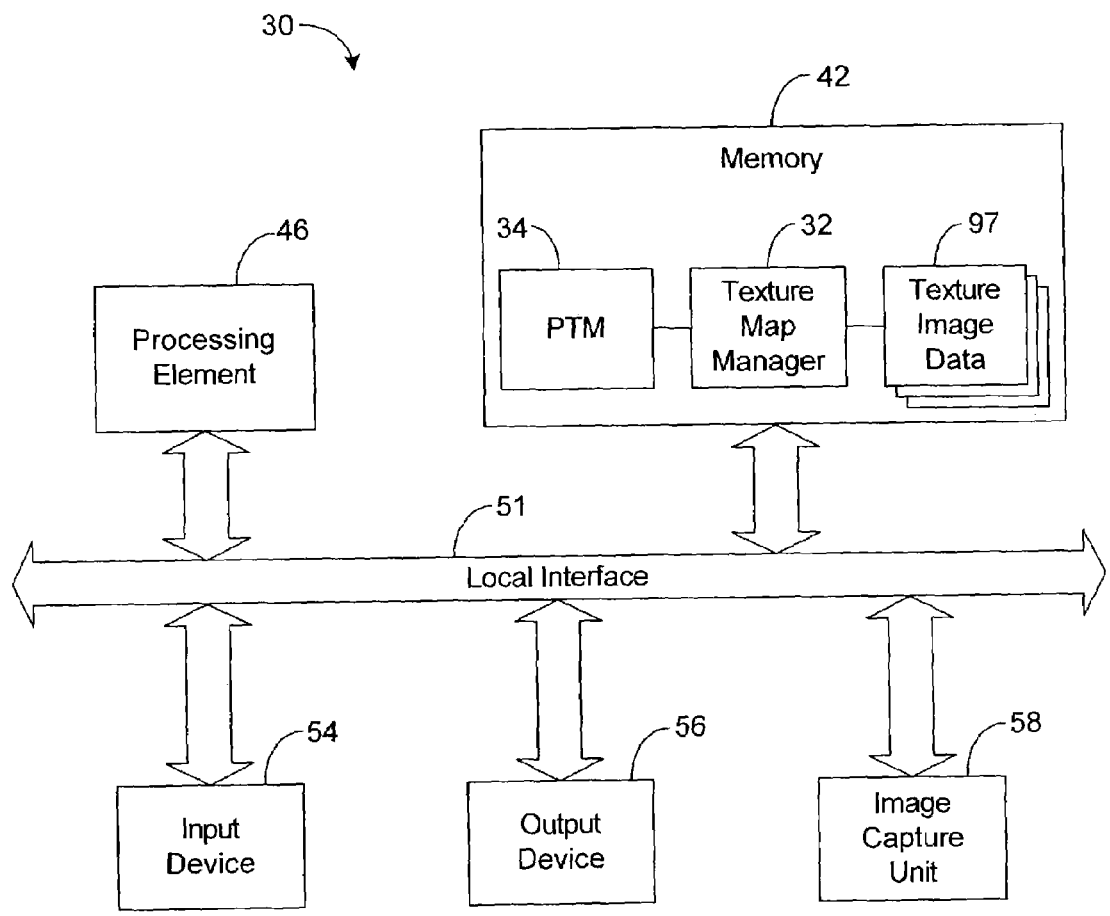
FIG. 1 is a block diagram illustrating a texture map generating and editing system in accordance with an exemplary embodiment of the present invention.

In this regard, FIG. 1 depicts a texture map generating and editing system 30 in accordance with a preferred embodiment of the present invention. As shown by FIG. 1, the system 30 preferably comprises a texture map manager 32 for generating and editing a parametric texture map (PTM) 34. As will be described in more detail hereafter, each texel of the PTM 34 preferably comprises at least one polynomial texture equation that allows the texel's luminosity value to be calculated as a function of light position or some other variable parameter. As used herein, a texel's "luminosity value" refers to a value indicative of at least the texel's brightness. In this regard, a texel's luminosity value may only indicate brightness or may indicate another luminosity parameter combined with the texel's brightness. For example, a luminosity value be a value that is indicative of a texel's brightness, independent of the texel's color, or a luminosity value, in another example, may be a value indicative of both color and brightness.

Note that the texture map manager 32 can be implemented in software, hardware, or any combination thereof. In a preferred embodiment, as illustrated by way of example in FIG. 1, the texture map manager 32, along with its associated methodology, is implemented in software and stored in memory 42 of the texture map generating and editing system 30.

Further note that the texture map manager 32, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the texture map manager 32 may be magnetically stored and transported on a conventional portable computer diskette.

A preferred embodiment of the graphical display system 30 of FIG. 1 comprises one or more conventional processing elements 46, such as a digital signal processor (DSP) or a central processing unit (CPU), that communicate to and drive the other elements within the system 30 via a local interface 51, which can include one or more buses. Furthermore, an input device 54, for example, a keyboard or a mouse, can be used to input data from a user of the system 30, and an output device 56, for example, a screen display or a printer, can be used to output data to the user.

In a preferred embodiment, the texture map manager 32 controls an image capture unit 58 for capturing a plurality of images of an object. As will be described in more detail below, for each captured image, the object is preferably lit by a light source from a different direction. The texture map manager 32 preferably analyzes the captured images to generate the PTM 34. Each texel of the PTM 34 may comprise color component values, which each represent one of the texel's color components. In a preferred embodiment, each texel comprises red (R), green (G), and blue (B) color component values, although color components other than red, green, and blue may be utilized in other embodiments.

In addition to the color component values, each texel also may comprise data defining a polynomial texture equation, also referred to herein as a "luminosity equation," representing the texel's luminosity behavior as a function of light direction. As will be described in more detail below, each luminosity equation is preferably based on a measure of luminosity values at a corresponding pixel of the captured images.

In this regard, each texel preferably corresponds to a particular set of pixel coordinates of the captured images. Further, to determine a polynomial texture equation for a texel, the texture map manager 32 may determine, for each of the captured images, the luminosity value of the pixel at the texel's corresponding set of coordinates. The determined luminosity values, referred to as "sample luminosity values," may indicate both color and brightness and may be averaged to determine the texel's color component values. In this regard, the red, green, and blue color component values (R, G, and B) assigned to the texel may respectively correspond to the red, green, and blue color components of the averaged luminosity value (i.e., the value averaged from the sample luminosity values). Furthermore, based on the foregoing sample luminosity values, the texture map manager 32 also may determine the texel's polynomial texture equation as a function of light position.

Such a polynomial texture equation preferably represents the luminosity behavior of the texel as the position of a light source illuminating the texel changes. Note that the polynomial texture equations of different texels may be different, thereby enabling the texture map manager 32 to establish a different luminosity behavior for different texels. Indeed, by assigning different texture equations to different texels, the manager 32 is able to account for the phenomena that different points of a non-homogenous surface may appear to respond differently to changes in light direction. As a result, a more realistic image of a graphical object may be produced when the PTM 34 is applied to the object's surface.

An exemplary methodology for generating the PTM 34 will now be described in more detail. In this regard, the image capture unit 58, operating under the direction and control of the texture map manager 32, preferably captures a plurality of images of a sample object, such as a piece of fabric, for example. As will be described in more detail hereafter, each of the images is preferably captured when the sample object is being lit from a different direction.

Figure 2:
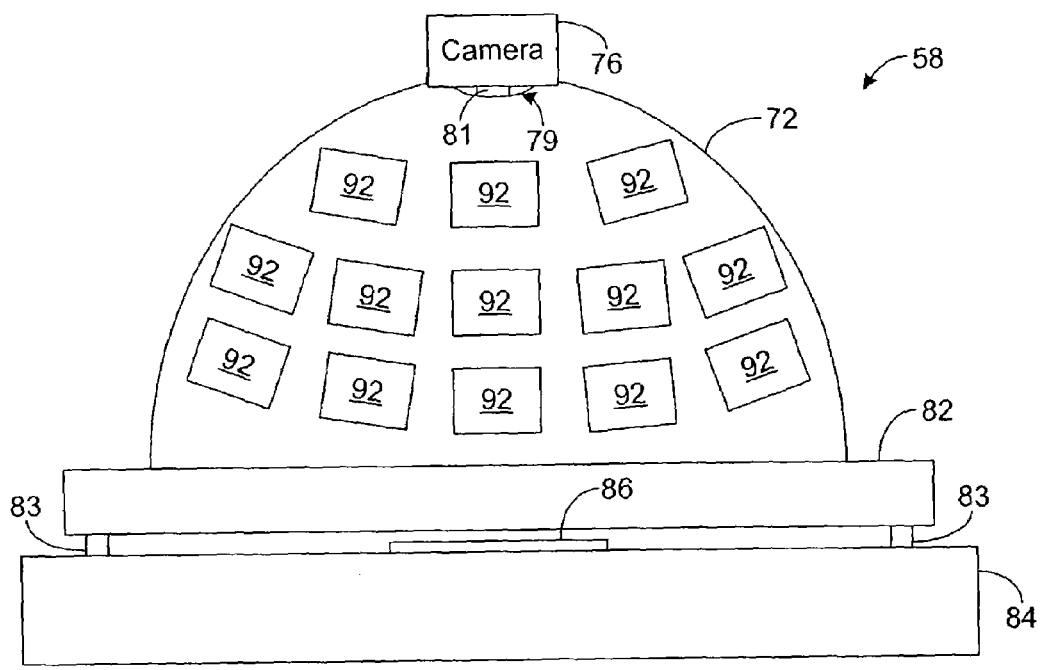
FIG. 2 is a diagram illustrating a side view of an image capture unit, such as is depicted in FIG. 1.
Figure 3:
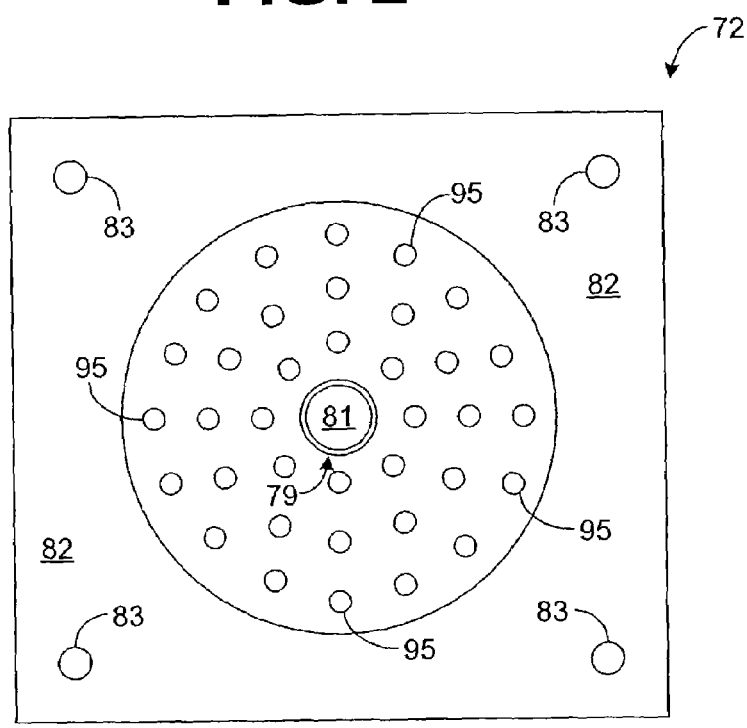
FIG. 3 is a diagram illustrating a bottom view of an image capture unit, such as is depicted in FIG. 2.

FIGS. 2 and 3 depict an exemplary image capture unit 58 that may be utilized to capture images of the sample object 86. In this exemplary embodiment, the image capture unit 58 comprises a dome structure 72 having a digital camera 76 mounted at the top of the structure 72, as shown by FIGS. 2 and 3, although other types of structures may be employed for mounting the camera 76 in other embodiments. In the embodiment depicted by FIGS. 2 and 3, the dome structure 72 has a hole 79 through which a lens 81 of the camera 76 can receive light from the interior of the dome structure 72. Furthermore, the dome structure 72 of FIG. 2 preferably has a base 82 coupled to a plurality of legs 83 for supporting the structure 72 when the structure 72 is placed on another base or structure 84, such as a table or desk, for example. In a preferred embodiment, the length and width of the base 82 is approximately 2.5 feet by 2.5 feet, and the height of the structure 72 is approximately 1.25 feet, although other dimensions of the structure 72 are possible in other embodiments.

A sample object 86 is preferably positioned underneath the dome structure 72, and the lens 81 of the camera 76 preferably points to and is focused on the sample object 86 such that the camera 76 automatically captures an image of the sample object 86 when the camera 76 is instructed to take a picture. As an example, the sample object 86 may be placed on the same structure 84 upon which the dome structure 72 is residing and may be positioned at the center of the structure 72 such that the sample object 86 is directly below the hole 79 and lens 81.

Figure 4:
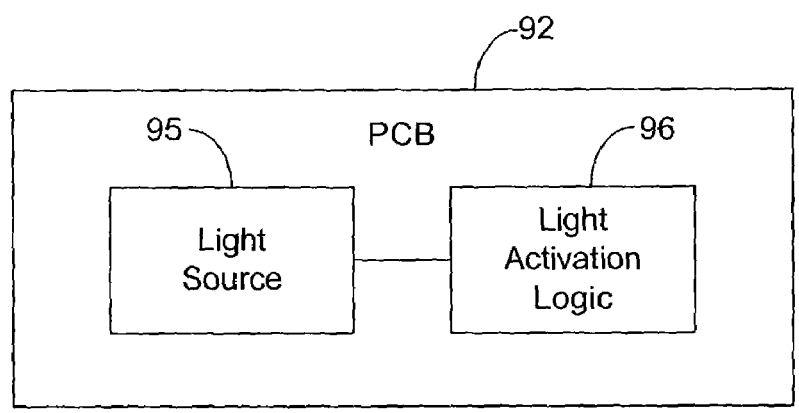
FIG. 4 is a block diagram illustrating a printed circuit board, such as is depicted in FIG. 2.

In the embodiment depicted by FIG. 2, a plurality of printed circuit boards (PCBs) 92 are mounted on the exterior of the dome structure 72. As shown by FIG. 4, each of the PCBs 92 preferably comprises a light source 95 (e.g., a light bulb, a light emitting diode, etc.) and light activation logic 96 for selectively activating and deactivating the light source 95 based on commands from the texture map manager 32. The light source 95 of each PCB 92 preferably extends through the dome structure 72 and is exposed to the interior of the dome structure 72, as shown by FIG. 3, such that light emitted from each of the light sources 95 illuminates the sample object 86. Each of the PCBs 92 and the camera 76 are preferably communicatively coupled to the local interface 51 (FIG. 1) and can exchange data with the texture map manager 32. Note that, if desired, one or more controllers (not shown) on one or more of the PCBs 92 or between the PCBs 92 and the local interface 51 may be employed to control the light sources 95 and/or facilitate communication between the PCBs 92 and the texture map manager 32.

In an image capture phase, the texture map manager 32 periodically transmits, to the camera 76, a command for causing the camera 76 to capture an image of the sample object 86. The images captured by the camera 76 are preferably used to generate the PTM 34 and will be referred to hereafter as "texture images." Furthermore, the command transmitted by the texture map manager 32 for causing the camera 76 to capture a texture image will be referred to hereafter as a "capture image command."

For each capture image command, the texture map manager 32 also transmits, to a different one of the PCBs 92, a command for causing the PCB's logic 96 to activate its corresponding light source 95. Such a command will be referred to hereafter as an "activation command." In response to the activation command, the PCB's logic 96 temporarily activates its corresponding light source 95 causing the light source 95 to flash light that briefly illuminates the sample object 86. The texture map manager 32 preferably controls the timing of the capture image command and the activation command such that the sample object 86 is being illuminated by the light source 95 when the camera 76 captures an image of the sample object 86.

Note that the texture map manager 32 preferably transmits a capture image command and an activation command for each PCB 92. Accordingly, each captured texture image corresponds to an image of the sample object 86 as the sample object 86 is being illuminated by a different one of the light sources 95 and, therefore, from a different direction. Note that the location of each light source 95 may be fixed, and for each texture image, the texture map manager 32 is preferably aware of the angle of incidence of the light that is illuminating the sample object 86. In this regard, the angle of incidence of light from each light source 95 on the sample object 86 may be measured and programmed into the texture map manager 32.

Each texture image captured by the camera 76 is preferably stored in the memory 42 (FIG. 1) of the texture map generating and editing system 30 as a set of texture image data 97. After the texture images are captured, the texture map manager 32 preferably analyzes the texture image data 97 and generates the PTM 34 based on the data 97. More specifically, the texture map manager 32, utilizing known or future-developed techniques, measures or otherwise determines the color of each pixel of each texture image defined by the data 97. The texture map manager 32 may then utilize the measured color values to derive color component values and/or luminosity equations for the texels of the PTM 34.

In this regard, the camera 76 and the sample object 86 preferably remain in a fixed position as the texture images are being captured during the image capture phase. Thus, pixels at the same set of coordinates for different texture images correspond to the same region or point on the sample object's surface. Moreover, each set of coordinates preferably corresponds to a different texel. Furthermore, to determine the color component values for a particular texel of the texture map 34, the texture map manager 32, for each texture image, determines the pixel's luminosity value (e.g., a value indicative of the pixel's color and brightness) at the set of coordinates that correspond to the particular texel. This may be achieved, for example, by identifying the particular set of coordinates for the texel and then retrieving, from each of the texture images, the luminosity value measured for the image's pixel that is located at or mapped to the identified set of coordinates. The manager 32 then averages the retrieved luminosity values to determine an averaged luminosity value for the particular texel. Values indicative of the color components of this averaged value are then utilized as the color component values (R, G, and B) for the particular texel.

To determine the luminosity equation for the particular texel, the texture map manager 32, for each texture image, preferably plots a luminosity value associated with the texel's corresponding set of coordinates. This may be achieved, for example, by identifying the particular set of coordinates for the texel and then retrieving, from each of the texture images, the luminosity value measured for the image's pixel that is located at the identified set of coordinates, as described above for determining the color component values. Each retrieved luminosity value may then be divided by the aforementioned averaged color value to derive a luminosity value (L) that is independent of the pixel's color. This luminosity value (L) may then be plotted as a function of the angle of incidence associated with the retrieved luminosity value.

Figure 5:
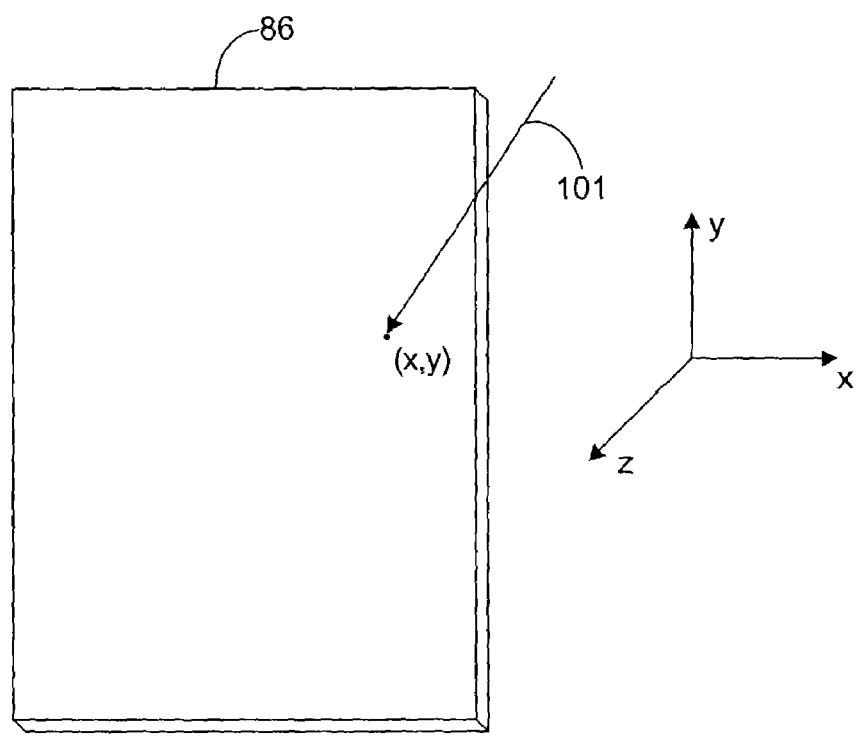
FIG. 5 is a diagram illustrating a three-dimensional view of a sample object that may be positioned underneath a dome structure, such as is depicted in FIG. 2.
Figure 6:
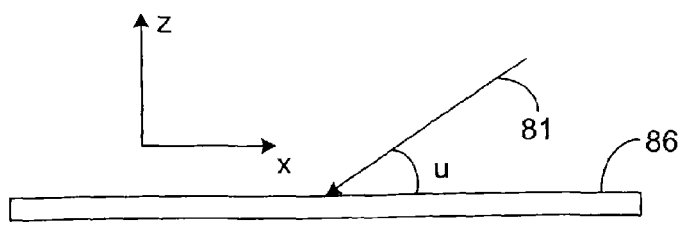
FIG. 6 is a diagram illustrating a side view of the sample object depicted in FIG. 5.
Figure 7:
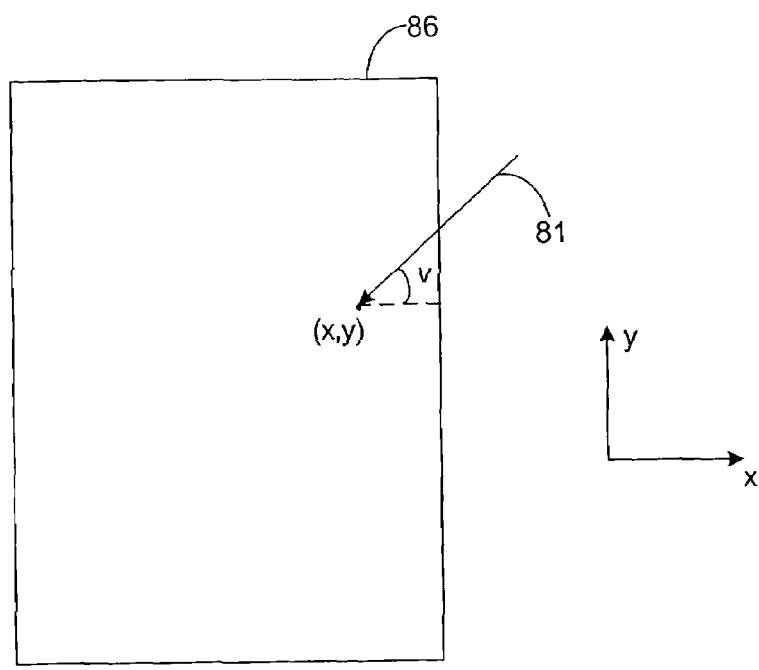
FIG. 7 is a diagram illustrating a top view of the sample object depicted in FIG. 5.

To better illustrate the plotting described above, assume that a texel associated with or mapped to coordinates (x,y) of the sample object 86 is selected. FIG. 5 depicts the sample object 86 wherein an arrow 101 represents the direction of light illuminating the object 86 when the camera 76 (FIG. 2) is capturing one of the texture images defined by the texture data 97 (FIG. 1). In particular, the arrow 101 indicates the direction from which the light source 95 illuminating the object 86 is positioned relative to the object 86. Note that the angle of incidence of the light illuminating the object 86 has two angular components, a "u" component and a "v" component. Each of these components is depicted in FIGS. 6 and 7, respectively.

Figure 8:
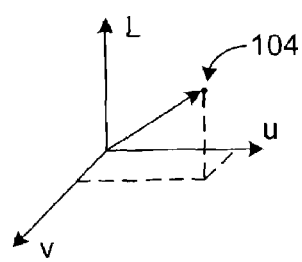
FIG. 8 is a diagram illustrating a three dimensional plot of a data point indicative of a measured luminosity and an angle of incidence for a texel of an image of the sample object depicted in FIG. 5.

Moreover, for the texture image captured in this example, angular components (u) and (v) are known values, and the pixel at coordinates (x,y) is associated with a measured luminosity value ($L_{measured}$) by the set of image data 97 defining the captured image. The measured luminosity value ($L_{measured}$) may be converted into a luminosity value (L) that is indicative of brightness only by dividing the measured luminosity value ($L_{measured}$) by an averaged luminosity value representing the average color of the pixel in the different images defined by the data 97. After determining the foregoing luminosity value (L), a three dimensional plot of (L, u, and v) can be performed, as shown by FIG. 8, in which point 104 represents the plotted value. In a preferred embodiment, such a plot is made for the same pixel (i.e., the pixel at the same set of coordinates) of each texture image captured during the image capture phase.

After performing a plot for the same pixel of each texture image, as described above, the texture map manager 32 preferably fits a three-dimensional curve (which represents an approximation of (L) as a function of (u) and (v)) to the plotted points. In a preferred embodiment, the well-known least squares approximation is employed by the texture map manager 32 to perform a curve fit, although other techniques for curve fitting may be performed in other embodiments. The texture map manager 32 also preferably derives a variable expression, such as an equation, representing the fitted curve or, in other words, representing an approximation of (L). In a preferred embodiment where least squares approximation is utilized for curve fitting, the resulting equation derived by the manager 32 is a bi-quadratic polynomial represented as:

$$L = F(u,v) = Au^2 + Bv^2 + Cuv + Du + Ev + F,$$

where (A, B, C, D, E, and F) are all constants and where (u) and (v) are variables. Note that this equation is representative of the luminosity behavior of the selected texel (i.e., the texel associated with coordinates (x,y)) as a function of (u) and (v), which are angular components of the texel's angle of incidence. Data defining the texel's luminosity equation is preferably stored in memory 42 as a portion of the PTM 34. Moreover, the aforementioned techniques are preferably repeated for each texel such that a luminosity equation, in addition to a set of color component values (R, G, and B), is derived and stored for each texel of the PTM 34.

Figure 9:
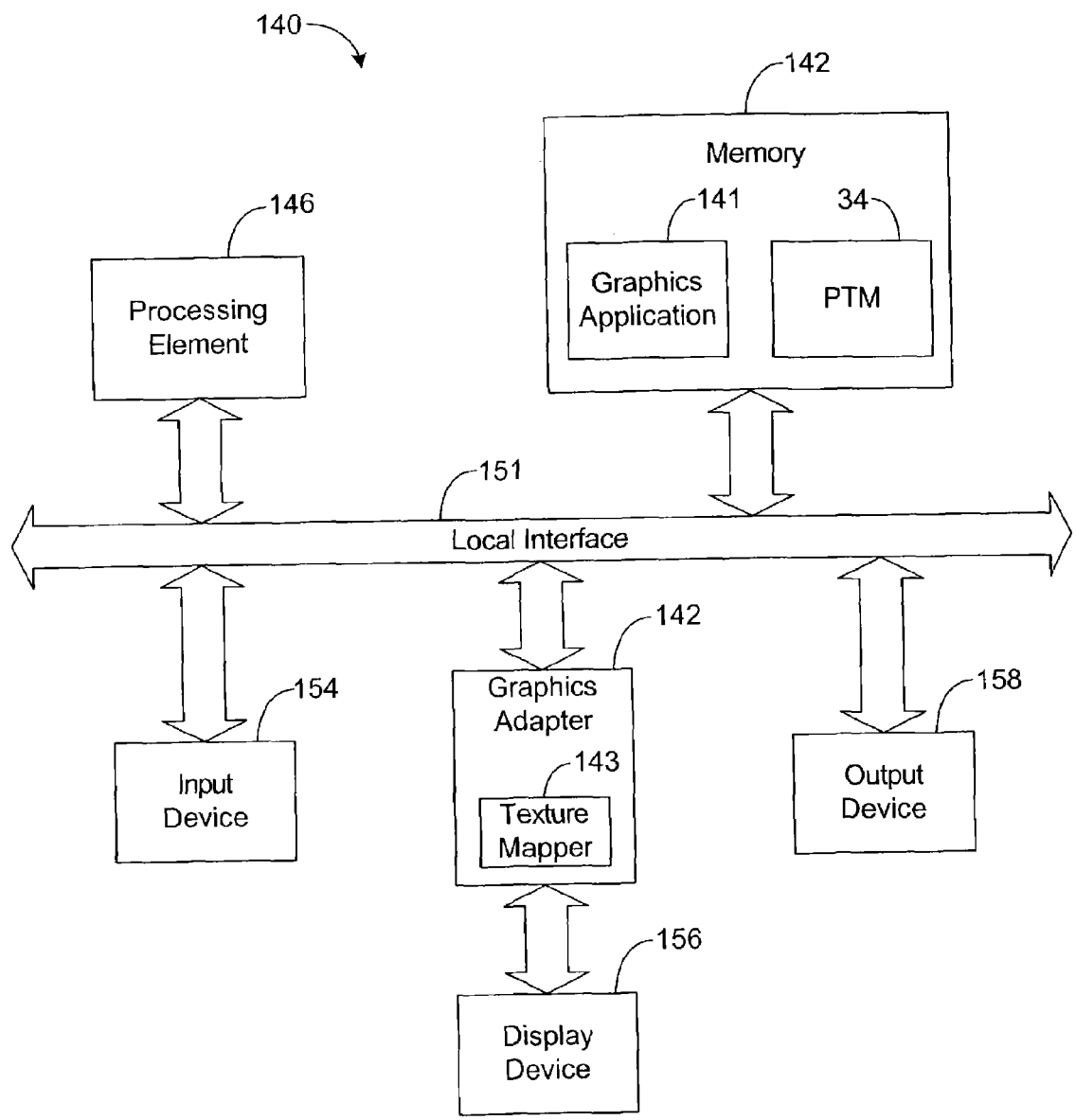
FIG. 9 is a block diagram illustrating a graphical display system in accordance with an exemplary embodiment of the present invention.

Once the texels of the PTM 34 are defined, the PTM 34 may be applied to one or more graphical objects by a graphical display system, such as the system 140 depicted by FIG. 9. Referring to FIG. 9, the system 140 preferably comprises a graphics application 141 having graphical data that defines one or more objects to be rendered by the system 140, and the system 140 preferably comprises a graphics adapter 142 for rendering the graphical objects defined by the graphics application 141. This graphics adapter 142 preferably comprises a texture mapper 143 for applying, to an object's surface, the PTM 34 generated and/or edited by the system 30 (FIG. 1) described above. Note that the graphics application 141 and the graphics adapter 142, including the texture mapper 143, may be implemented in software, hardware, or any combination thereof.

A preferred embodiment of the graphical display system 140 of FIG. 9 comprises one or more conventional processing elements 146, such as a digital signal processor (DSP) or a central processing unit (CPU), that communicate to and drive the other elements within the system 140 via a local interface 151, which can include one or more buses. Furthermore, an input device 154, for example, a keyboard or a mouse, can be used to input data from a user of the system 140, and an output device 156, for example, a screen display or a printer, can be used to output data to the user.

During operation, the graphics adapter 142 preferably receives graphical data (e.g., primitives) from the graphics application 141 and renders the graphical data to the output device 156. When a graphical object is being rendered by the graphics adapter 142, the texture mapper 143 may apply the texture defined by the PTM 34 to the surface of the graphical object. For illustrative purposes, assume that a graphical object being rendered by the graphics adapter 142 has a surface, referred to hereafter as the "textured surface," to which the texture of the PTM 34 is to be applied.

For each pixel of the textured surface, the texture mapper 143, based on the coordinates of the pixel, maps the pixel to one or more texels of the PTM 34. As set forth above, each texel of the PTM 34 of a preferred embodiment is associated with a luminosity equation in addition to color component values. Moreover, if a single texel is mapped to a pixel of the textured surface, the texture mapper 143 preferably calculates a luminosity value (L) for the mapped texel based on the texel's luminosity equation.

To calculate such a luminosity value (L), the texture mapper 143 determines the direction that light illuminates the pixel or, in other words, determines the values of (u) and (v) for the pixel. In this regard, the graphics application 141 preferably specifies a light source direction indicative of a direction of light that is illuminating the primitives generated by the graphics application 141. For each primitive, the graphics application 141 also preferably provides data indicative of the primitive's orientation and, more specifically, indicative of a direction that is perpendicular to the primitive's surface. This data is sometimes referred to as a "primitive normal." Knowing the light direction and the primitive normal, the texture mapper 143 may calculate the angle of incidence of the light for the primitive or, in other words, may calculate the primitive's (u) and (v) values. The texture mapper 143 may then substitute these values for the variables (u) and (v), respectively, in the luminosity equation being utilized to calculate the luminosity value being applied to the pixel. Once this is done, all of the values except (L) in the luminosity equation are known, and the texture mapper 143 can, therefore, solve the equation for (L).

In the present embodiment, the calculated luminosity value (L) is a value indicative of the texel's brightness only and is independent of the mapped pixel's color. Thus, to derive the color values of the texel, the texture mapper 143 preferably combines the calculated luminosity value (L) with the texel's color component values (R, G, and B) stored in the PTM 34.

More specifically, the texture mapper 143 preferably multiplies the calculated luminosity value (L) to each color component value (R, G, and B) of the texel to generate new color component values, referred to hereafter as "calculated color component values ($R_C$, $G_C$, and $B_C$)." The texture mapper 143 then applies the calculated color component values ($R_C$, $G_C$, and $B_C$) to the mapped pixel according to well-known or future-developed texture mapping techniques. In this regard, the texture mapper 143 may apply the texel's calculated color component values to the mapped pixel according to the same techniques utilized by conventional texture mappers in applying a texel's constant color component values to a mapped pixel.

If multiple texels of the PTM 34 are mapped to the pixel of the textured surface, then the texture mapper 143 is preferably designed to interpolate new color component values (R', G', and B') and a new luminosity equation (L') based on the color component values and the luminosity equations of the mapped texels. In this regard, it is common for conventional texture mappers to interpolate a texture value for a pixel based on the texture values of a plurality of texels mapped to the pixel. These same interpolation techniques may be employed by the texture mapper 143 to interpolate the new color component values (R', G', and B') based on the corresponding color components (R, G, and B) from the mapped texels.

Furthermore, each luminosity equation, in a preferred embodiment, comprises a set of constants (A, B, C, D, E, and F). The texture mapper 143 preferably utilizes the constants of the luminosity equations of the mapped texels to derive a new set of constants (A', B', C', D', E', and F') for the luminosity equation being interpolated by the mapper 143.

For example, the mapper 143 may be configured to interpolate a new constant (A') based on the corresponding constant (A) from each of the luminosity equations of the mapped texels. As noted above, it is common for conventional texture mappers to interpolate a color value for a pixel based on the color values of a plurality of texels mapped to the pixel. Such interpolation techniques may be employed, by the texture mapper 143, to interpolate (A') based on the corresponding constant (A) from the luminosity equations of the mapped texels. Further note that each of the constants (B', C', D', E', and F') may be similarly interpolated based on the corresponding constants (B, C, D, E, and F), respectively, from the luminosity equations of the mapped texels.

Once the new set of constants (A', B', C', D', E', and F') is determined, the new luminosity equation is defined and may be expressed as:

$$L'=F(u,v)=A'u^2+B'v^2+C'uv+D'u+E'v+F',$$

where (u) and (v) are variables representing the angular components of the angle of incidence of the light illuminating the pixel. After determining this new luminosity equation and the values of (u) and (v), the texture mapper 143 preferably calculates a luminosity value (L') based on the new luminosity equation. The texture mapper 143 preferably multiplies each of the new color component values (R', G', and B') by the calculated luminosity value (L') to generate a calculated set of color component values ($R_C$, $G_C$, and $B_C$) and then applies the calculated color component values to the mapped pixel. In applying the calculated color component values ($R_C$, $G_C$, and $B_C$) to the mapped pixel, the texture mapper 143 may utilize the same techniques employed by conventional texture mappers in applying a texel's color component values to a mapped pixel.

It should be noted that various modifications may be made to the embodiments described above without departing from the principles of the present invention. For example, in the embodiment described above, each texel of a PTM 34 comprises color component values (R, G, and B) and a luminosity equation (L). Furthermore, when applying a texel to a pixel, the texture mapper 143 generally calculates (L) based on light position and multiplies each color component value (R, G, and B) by the calculated value (L). However, if desired, the color component values (R, G, and B) may be respectively combined (e.g., multiplied) with the luminosity equation (L) to generate three new luminosity equations ($L_{red}$, $L_{green}$, and $L_{blue}$), referred to hereafter as "color component luminosity equations." Each of the color component luminosity equations may then be stored in the PTM 34 to define a texel in lieu of the color component values (R, G, and B) and the single luminosity equation (L).

During texture mapping, each of the color component luminosity equations ($L_{red}$, $L_{green}$, and $L_{blue}$) may be solved based on light direction in the same way that the luminosity equation (L) is solved in the embodiment previously described above. Solving the color component luminosity equations generates three color component luminosity values ($L_{red}$, $L_{green}$, and $L_{blue}$). Note that each of the color component luminosity values ($L_{red}$, $L_{green}$, and $L_{blue}$), similar to the calculated color component values ($R_C$, $G_C$, and $B_C$) described above, is a value indicative of one of the texel's color components that is to be applied to the mapped pixel. In this regard, the color component luminosity values ($L_{red}$, $L_{green}$, and $L_{blue}$) are indicative of both brightness and color. Moreover, the color component luminosity values ($L_{red}$, $L_{green}$, and $L_{blue}$) may be applied to the mapped pixel in the same way that conventional texture mappers apply the constant color component values of a texel of a conventional texture map to a corresponding pixel.

It should be noted that defining multiple color component luminosity equations ($L_{red}$, $L_{green}$, and $L_{blue}$) for each texel likely requires more data than defining three color component values (R, G, and B) and a single luminosity equation (L) for each texel. Therefore, in some embodiments, it may be desirable to define the texels of a PTM 34 with color component values (R, G, and B) and a luminosity equation (L) according to previously described embodiments.

However, in some embodiments, utilizing color component luminosity equations may help to improve texture mapping results. In this regard, in generating a PTM 34, the texture map manager 32 may be configured to subdivide the sample color value measured for each image into color components (e.g., red, green, and blue). More specifically, the texture map manager 32, when analyzing the texture image data 97, may measure or otherwise determine the luminosity of each color component. Then, for each texel, the texture map manager 32 may determine a color component luminosity equation for each color component rather than a single luminosity equation (L), as previously described above.

Note that in determining color component luminosity equations ($L_{red}$, $L_{green}$, and $L_{blue}$) in such an embodiment, the texture map manager 32 may employ techniques similar those described above in a preferred embodiment for determining a texel's luminosity equation (L). For example, to determine a red color component luminosity equation ($L_{red}$) for a texel, the texture map manager 32 (FIG. 1) may measure a red luminosity value ($L_{red}$) for the corresponding pixel in each digital image defined by the texture image data 97. The manager 32 may then plot each measured red luminosity value ($L_{red}$) as a function of the angle of incidence associated with the measured red luminosity value, similar to how the manager 32 in the previously described embodiment plots (L) as a function of the angle of incidence associated with (L). However, note that ($L_{red}$) in the present embodiment is a value indicative of both color and brightness, whereas (L) in the previously described embodiment is indicative of brightness only.

After plotting ($L_{red}$) for the corresponding pixel in each image defined by the texture data 97, the texture map manager 32 may fit a three-dimensional curve to the plotted points and derive an equation ($L_{red}$) of this curve. Such an equation represents an approximation of the texel's luminosity behavior for the red color component and may be expressed as:

$$L_{red}=F(u,v)=(A_{red})u^2+(B_{red})v^2+(C_{red})uv+(D_{red})u+(E_{red})v+F_{red}.$$

Similar techniques may be employed to determine color component luminosity equations for the other color components of the texel. For example, when the other color components are blue and green, the luminosity equations for the other color components may be expressed as:

$$L_{blue}=F(u,v)=(A_{blue})u^2+(B_{blue})v^2+(C_{blue})uv+(D_{blue})u+(E_{blue})v+F_{blue};$$

and $$L_{green}=F(u,v)=(A_{green})u^2+(B_{green})v^2+(C_{green})uv+(D_{green})u+(E_{green})v+F_{green}.$$

Moreover, in the present embodiment, each texel of the PTM 34 may comprise a different luminosity equation ($L_{red}$, $L_{blue}$, or $L_{green}$) for each color component. Each of these equations may then be used, as described above, to apply a color component of the texel to a corresponding pixel.

Note that when color component luminosity equations are separately generated by the manager 32 as just described above, the luminosity behavior of each color component may be different. In other words, the red color component of a texel may appear to respond to changes in light direction in a different manner than the other color components of the texel. Such an effect may help to enhance the realism of the texture defined by the PTM 34.

It should also be noted that, in a preferred embodiment, as described above, the luminosity equations, including the color component luminosity equations, are represented as bi-quadratic polynomials. However, in other embodiments, the luminosity equations may be defined by other types of equations. For example, if desired, bi-cubic polynomials could be utilized to express the luminosity equations. In such embodiments, similar techniques as those described above for the aforedescribed embodiments may be employed in order to determine and apply luminosity values to different pixels.

To better illustrate the texture map generation and texture mapping processes described above, assume that the graphics application 141 (FIG. 9) comprises graphical data defining an image of a car seat. Further assume that it is desirable for a viewer to see an image of the car seat as if the car seat is covered in a particular fabric. In a preferred embodiment, a sample of the fabric is positioned underneath the dome structure 72 of FIG. 2 and below the camera 76. Once this occurs, the user preferably submits an input, via input device 54 (FIG. 1), indicating that the image capture phase may commence.

Figure 10:
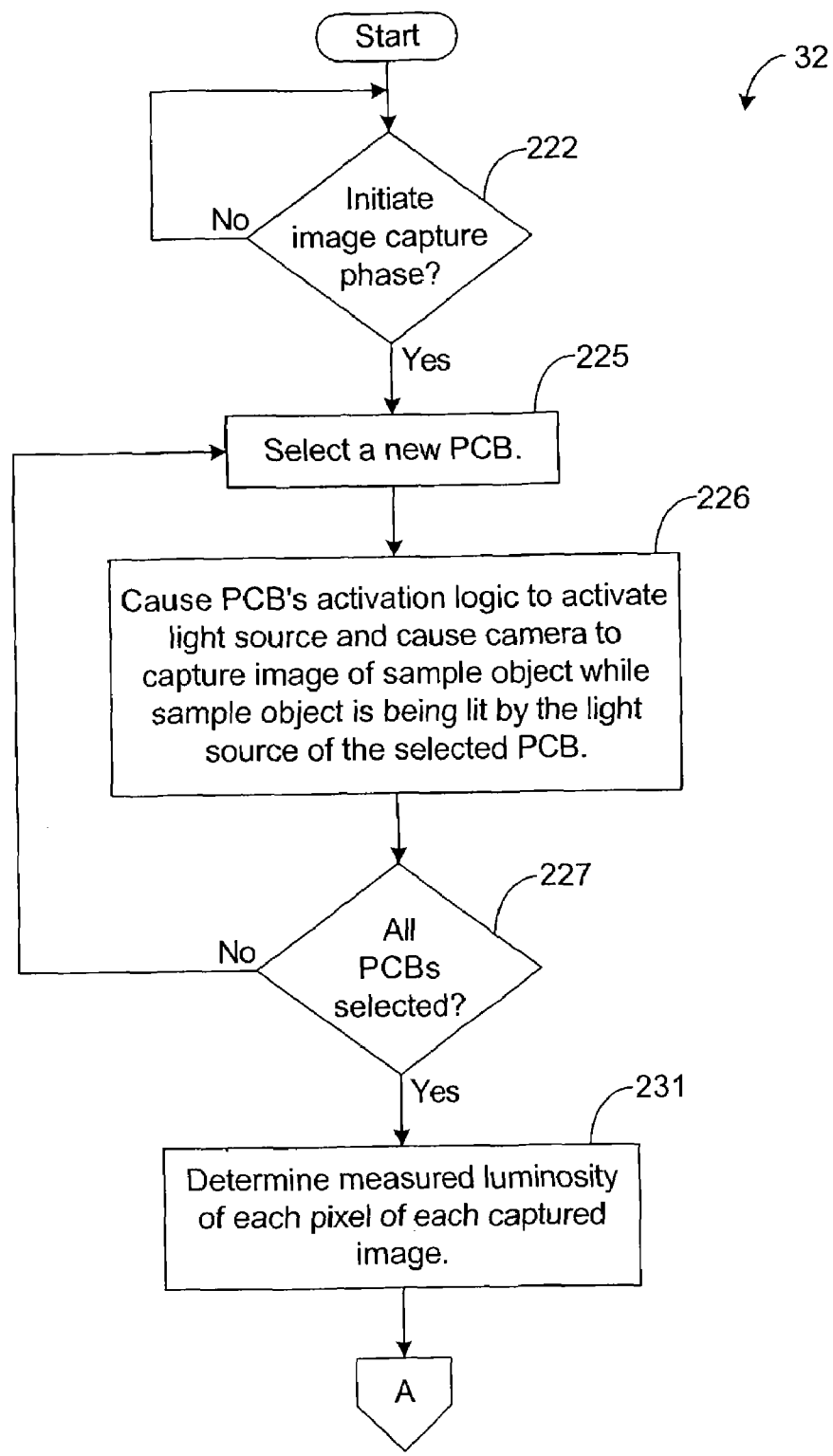
FIGS. 10 and 11 illustrate a flow chart depicting an exemplary process for generating a PTM in accordance with an exemplary embodiment of the present invention.

In response, the texture map manager 32 selects a PCB 92, as shown by blocks 222 and 225 of FIG. 10. The texture map manager 32 then transmits an activation command to the selected PCB 92 and transmits an image capture command to the camera 76 such that the camera 76 takes a picture of the sample object 86 (i.e., the sample fabric) as the object 86 is being illuminated by the light source 95 of the selected PCB 92, as shown by block 226. Once the image of the object is captured, the camera 76 preferably stores the captured image in memory 42 (FIG. 1) as a set of texture image data 97. Note that an image captured by a PCB 92 is associated with a particular set of (u) and (v) values representing the angular components of the angle of incidence that the light from the PCB's light source 95 illuminates the object 86. The (u) and (v) values may be predefined values stored in the system 30.

As an example, a user may physically measure or estimate the direction or angle from which the PCB's light source 95 illuminates the sample object 86. The user may then program the (u) and (v) components values into the texture map manager 32. Then, when the camera 76 captures an image of the object 86, which the PCB's light source 95 is illuminating, the texture map manager 32 may associate the programmed (u) and (v) values with the captured image.

After the image is captured, the texture map manager 32 preferably selects another PCB 92 and repeats the aforedescribed techniques, as shown by blocks 225-227, such that another image is captured as the object 86 is being illuminated from a different direction by the light source 95 of another PCB 92. As shown by block 231, the texture map manager 32 preferably measures or otherwise determines the luminosity of each pixel within each of the texture images defined by the texture image data 97. These measured luminosity values may then be used to determine color component values and luminosity equations for the different texels of the PTM 34.

Figure 11:
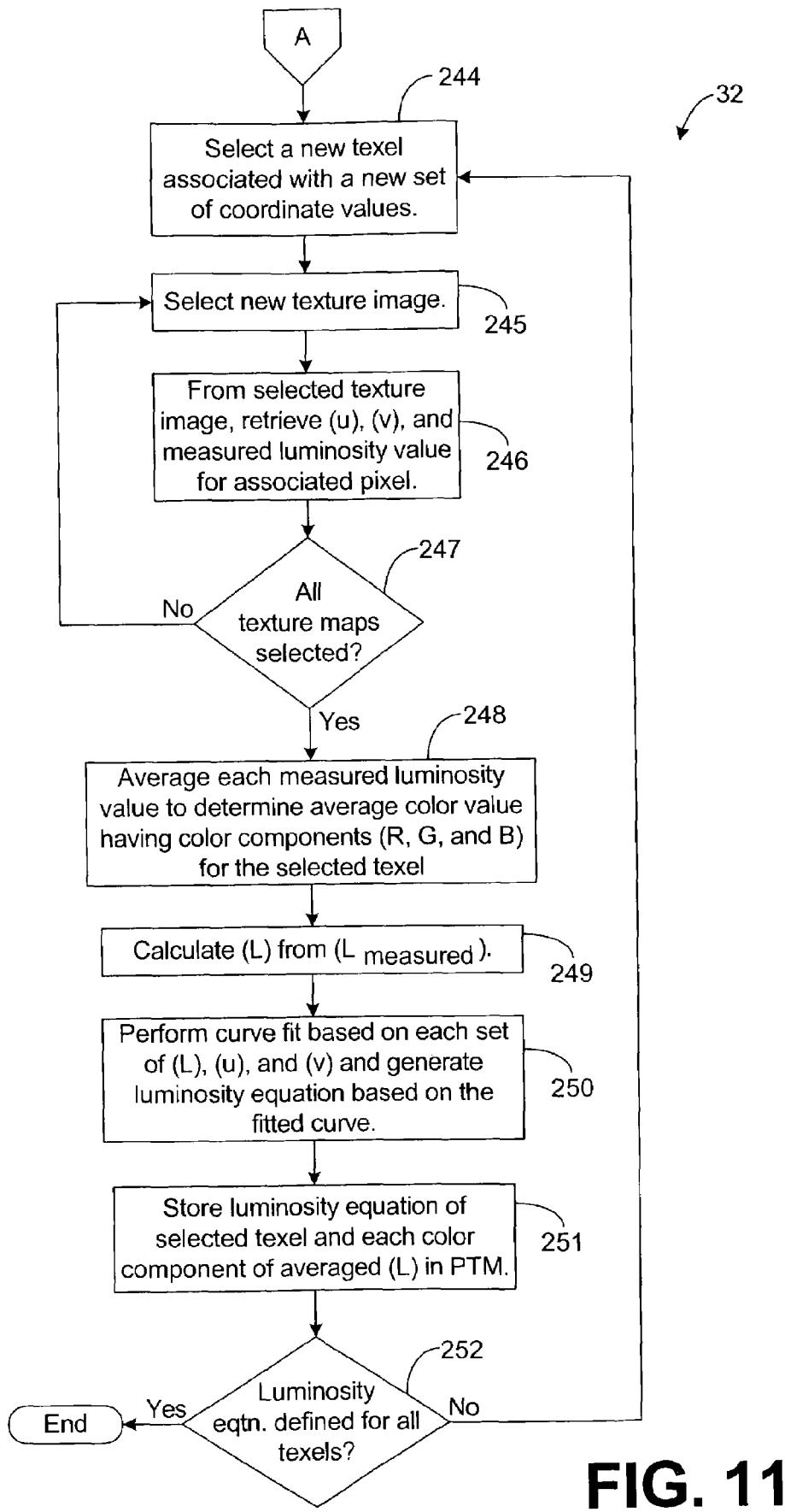

In this regard, the texture map manager 32, in block 244 of FIG. 11, preferably selects a new texel, which is associated with a particular set of coordinate values. Then, in block 245, the texture map manager 32 selects a new texture image defined by the data 97. For this selected texture image, the texture map manager 32 retrieves, in block 246, the measured luminosity value ($L_{measured}$) for the pixel that is located at the particular set of coordinate values associated with the texel selected in block 244. In block 246, the texture map manager 32 also retrieves the (u) and (v) values associated with the texture image selected in block 245.

After retrieving a set of ($L_{measured}$), (u), and (v) values in block 246, the texture map manager 32 selects another texture image and repeats blocks 245 and 246. As shown by blocks 245-247, the texture map manager 32 continues to repeat blocks 245 and 246 for different texture images until block 246 has been performed for all of the texture images defined by the data 97.

As shown by block 248, the texture map manager 32 then calculates an average, referred to hereafter as the "averaged (L)," of the measured luminosity values ($L_{measured}$) retrieved via block 246. The color components of the averaged (L) are preferably utilized as the color components (R, G, and B) of the selected texel. Further, in block 249, each measured luminosity value ($L_{measured}$) retrieved in block 246 is converted into a luminosity value (L) by dividing the measured luminosity value ($L_{measured}$) by the averaged (L). This luminosity value (L) is indicative of brightness only, although the luminosity value (L) calculated in block 249 may be indicative of other parameters in other embodiments.

As shown by block 250, the texture map manager 32 performs a curve fit, using each set of (L), (u), and (v) values derived from a single texture image as a different data point, and the texture map manager 32, based on this curve fit, determines an equation for the fitted curve. This equation is the luminosity equation for the PTM texel selected in block 244 and is stored in the PTM 34 in block 251 along with the color component values of the selected texel.

After defining and storing the luminosity equation and color component values for one texel of the PTM 34 via blocks 244-251, the texture map manager 32 repeats blocks 244-251 for another texel that is associated with another set of coordinates. Indeed, the texture map manager 32 preferably repeats blocks 244-251 for each different texel of the PTM 34. Once a luminosity equation has been defined for each texel of the PTM 34 in this way, the PTM 34 is complete, and the process of generating the PTM 34 preferably ends, as shown by block 252.

Figure 12:
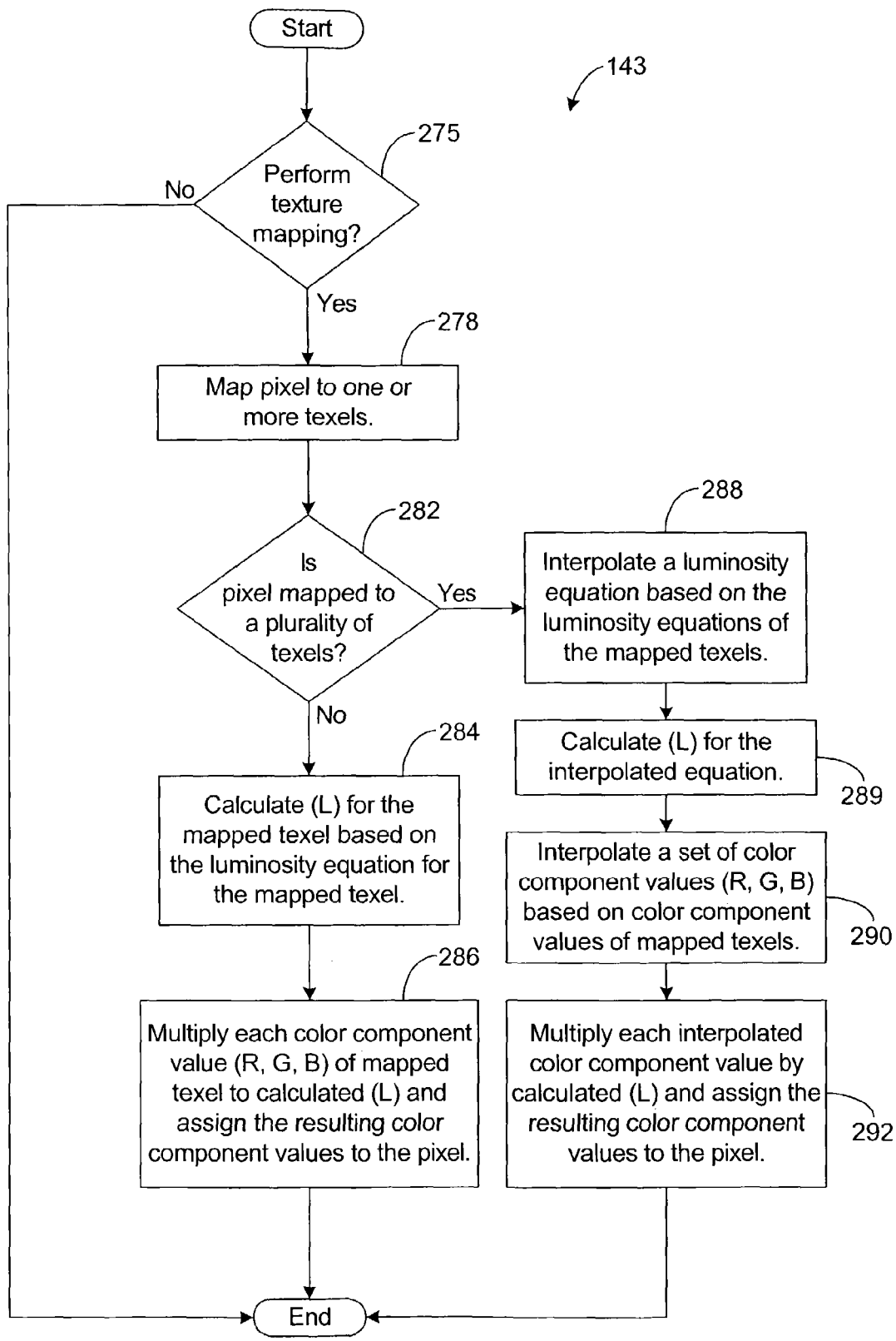
FIG. 12 illustrates a flow chart depicting an exemplary process for performing texture mapping in accordance with an exemplary embodiment of the present invention.

After the PTM 34 has been generated, the PTM 34 may be stored and used by the graphical display system 140 of FIG. 9. In this regard, continuing with the illustrative car seat example, the graphics application 141 may generate primitives defining the car seat. When the graphics adapter 142 is rendering a pixel of the car seat's surface, the texture mapper 143 preferably applies the PTM 34 to the pixel. More particularly, when rendering the pixel, the texture mapper 143 determines, in block 275 of FIG. 12, whether the pixel defines a portion of the car seat surface. If so, the texture mapper 143 maps one or more texels of the PTM 34 to the pixel, as shown by block 278.

If a single texel is mapped to the pixel, then the mapper 143 calculates a luminosity value (L) from the mapped texel's luminosity equation stored in the PTM 34, as shown by blocks 282 and 284. Note that this luminosity value is based on the angle of incidence for the light that illuminates the pixel. As set forth above, this angle of incidence may be determined from data provided by the graphics application 141. After calculating a luminosity value (L) from the mapped texel's luminosity equation, the mapper 143 multiplies each of the color component values (R, G, and B) of the mapped texel by the calculated luminosity value (L) to generate a set of calculated color component values ($R_C$, $G_C$, and $B_C$), as shown by block 286. Also in block 286, the texture mapper 143 applies or assigns the calculated color component values ($R_C$, $G_C$, and $B_C$) to the pixel.

If multiple texels of the PTM 34 are mapped to the pixel in block 278, then the texture mapper 143 is preferably designed to interpolate a new luminosity equation based on the luminosity equations of the mapped texels, as shown by blocks 282 and 288. After interpolating a new luminosity equation in block 288, the texture mapper 143 calculates a luminosity value (L) from the interpolated luminosity equation, as shown by block 289. Note that this luminosity value is based on the angle of incidence for the light that illuminates the pixel.

As shown by block 290, the mapper 143 interpolates a set of color component values (R, G, and B) based on the color component values of the mapped texels. The mapper 143 then multiples each of the interpolated color component values by the calculated luminosity value (L) to generate a set of calculated color component values ($R_C$, $G_C$, and $B_C$), as shown by block 292. Also in block 292, the mapper 143 applies or assigns the calculated color component values ($R_C$, $G_C$, and $B_C$) to the pixel.

After color component values are assigned to the pixel in block 286 or 292, the pixel is rendered by the graphics adapter 142. The output device 156 then displays the pixel based on the color component values assigned to the pixel by the texture mapper 143.

Note that, as the texture mapper 143 receives more primitives of the car seat's surface, tiling techniques may be employed to apply the PTM 34 across the surface of the car seat. Tiling techniques for applying a texture map across the surface of a graphical object are generally well-known in the art.

Once each of the pixels of the car seat is rendered by the graphics adapter 142, the display device 156 displays an image of the car seat. This displayed car seat appears to be covered with the fabric from which the texture image data 97 is based. In other words, the displayed car seat appears to be covered with the fabric (i.e., the sample object 86) positioned underneath the dome structure 72 (FIG. 2).

Furthermore, by defining the luminosity equations as a function of light direction, as described above, the luminosity equations take into account the phenomena that different point elements of the sample fabric may appear to respond to changes in light direction differently. Thus, utilization of the luminosity equations to calculate the color values that are applied to the car seat by the texture mapper 143 helps to create a more realistic image of the car seat.

It should be noted that, in a preferred embodiment, the user of the system 140 may submit an input, via input device 154, for changing the direction from which the graphical object (e.g., the car seat) is being illuminated. For example, the user may submit an input for moving a simulated light source illuminating the graphical object from one model position to a different model position. In response to such an input, the graphics application 141 preferably calculates a new angle of incidence for each primitive of the graphical object based on the new position of the light source relative to the graphical object. According to the aforedescribed rendering process, the new angle of incidence affects the luminosity values calculated from the luminosity equations in blocks 284 and 289 of FIG. 12. More specifically, a different angle of incidence may cause the texture mapper 143 to calculate a different luminosity value (L) from the same luminosity equation.

Figure 13:
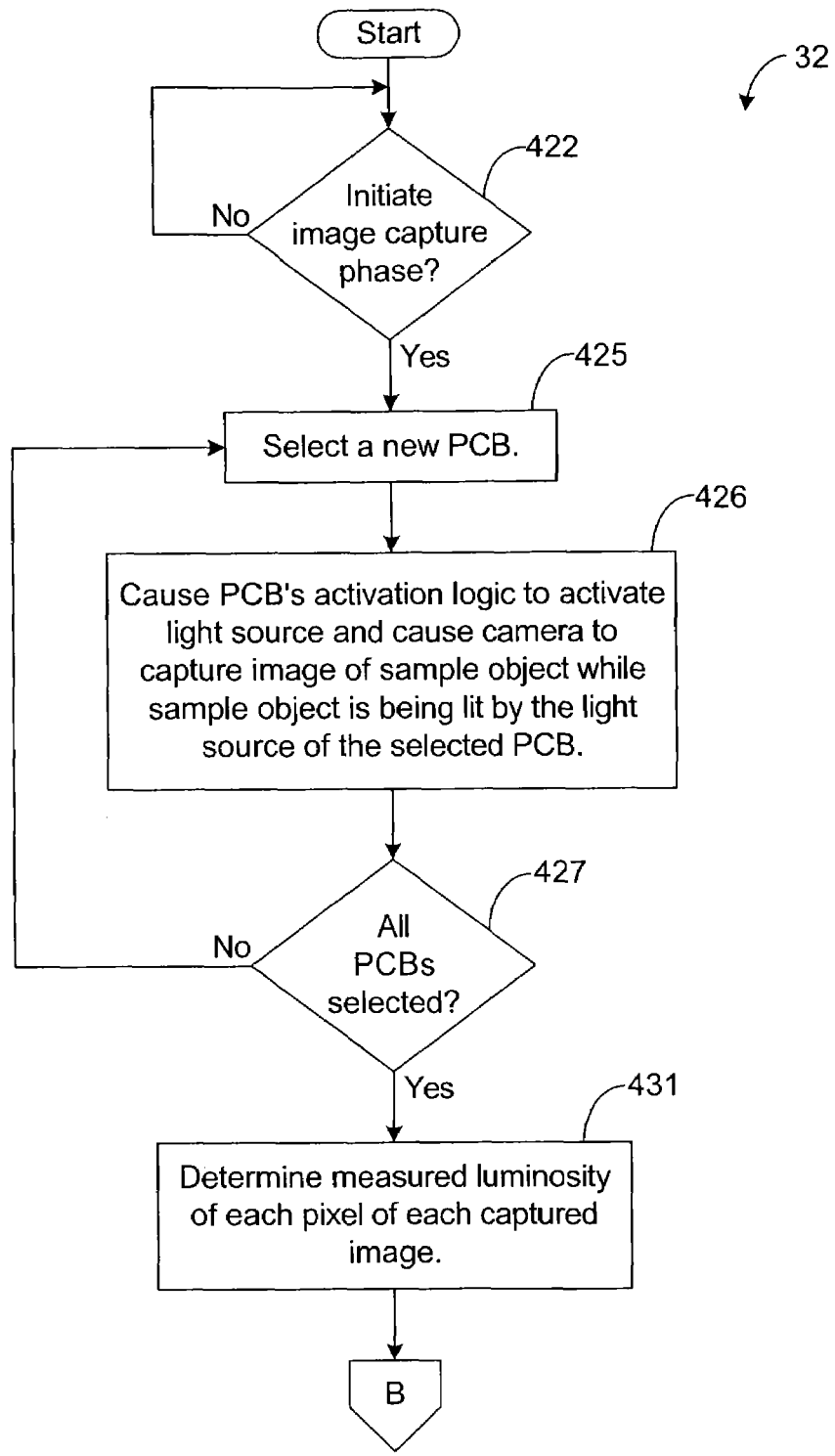
FIGS. 13 and 14 illustrate a flow chart depicting an exemplary process for generating a PTM having color component luminosity equations in accordance with an exemplary embodiment of the present invention.
Figure 14:
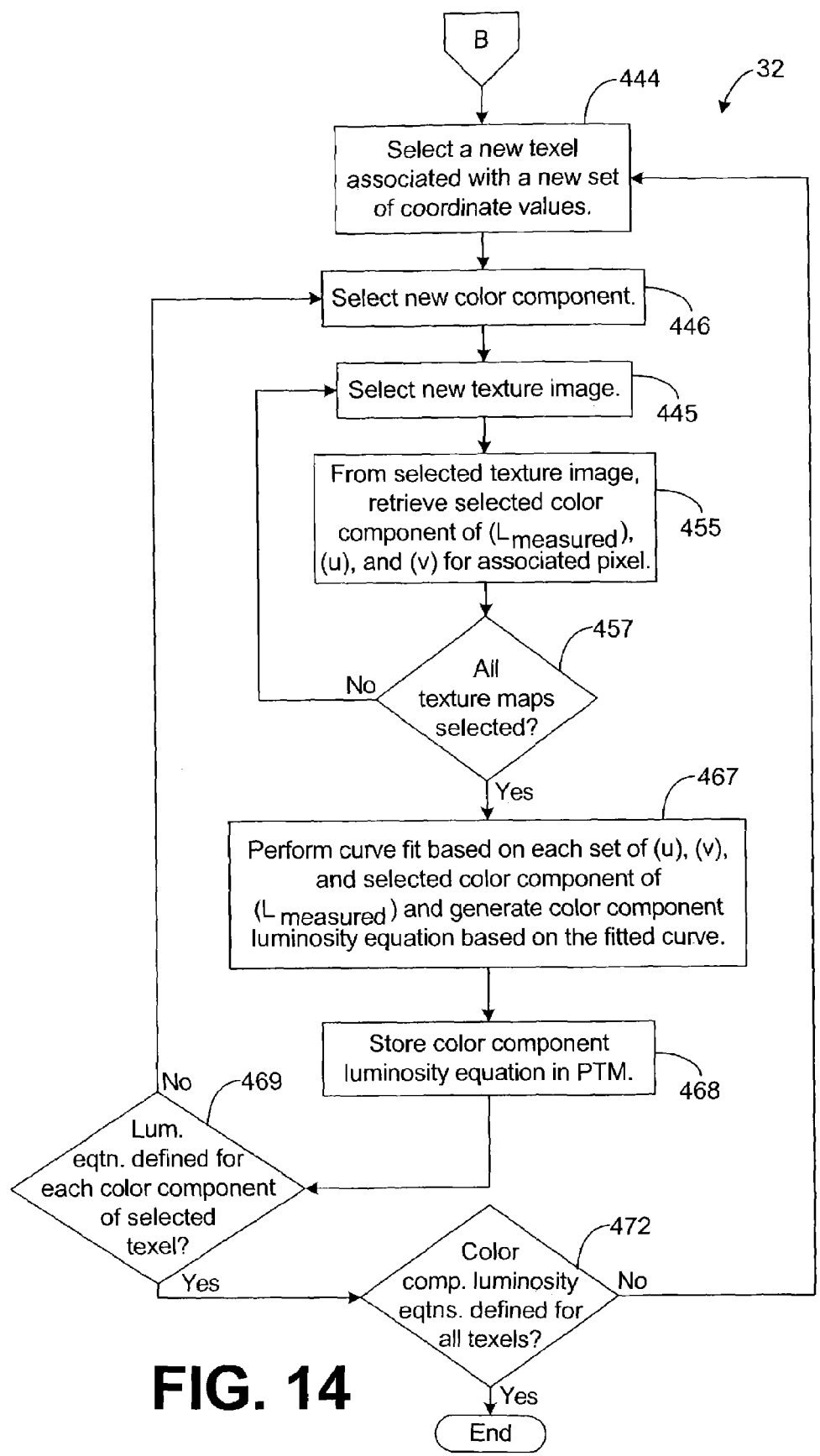

FIGS. 13 and 14 depict an exemplary process for generating a PTM 34 having texels defined by color component luminosity equations ($L_{red}$, $L_{green}$, and $L_{blue}$). As can be seen by comparing FIGS. 13 and 14 to FIGS. 10 and 11, the foregoing process may be similar to the PTM generation process depicted by FIGS. 10 and 11. Indeed, blocks 422, 425, 426, 427, 431, and 444 of FIGS. 13 and 14 are respectively the same as blocks 222, 225, 226, 227, 231, and 244 of FIGS. 10 and 11. However, in the process depicted by FIGS. 13 and 14, the texture map manager 32, after performing block 444, selects a color component (e.g., red, green, or blue) in block 446. Then, after selecting a new texture image in block 445, the texture map manager 32, in block 455, retrieves the selected component of the measured luminosity value ($L_{measured}$) for the pixel that is located at the set of coordinate values associated with the texel selected in block 444. The texture map editor 32 also retrieves the angular components (u) and (v) for the angle of incidence of the texture image selected in block 455. Note, in particular, that the luminosity value retrieved in block 455 is a color component of the overall luminosity value measured for the associated pixel.

For example, if the red color component is selected in block 446, then the manager 32 preferably retrieves the red color component of the measured luminosity value ($L_{measured}$). Therefore, the luminosity equation later generated in block 467 and stored in block 468 preferably corresponds to a representation of the luminosity behavior of the selected color component only. As depicted by block 469, the aforedescribed process for defining and storing a color component luminosity equation for the selected texel is repeated for each different color component of the selected texel. Further, as shown by block 472, the process depicted by FIG. 14 continues until color component luminosity equations have been defined for all texels. Moreover, once the process depicted by FIGS. 13 and 14 is completed, each texel preferably comprises color component equations ($L_{red}$, $L_{green}$, and $L_{blue}$). Note that changes to the aforedescribed algorithm depicted by FIGS. 13 and 14 or different algorithms may be implemented to generate a PTM 34 in other examples.

Figure 15:
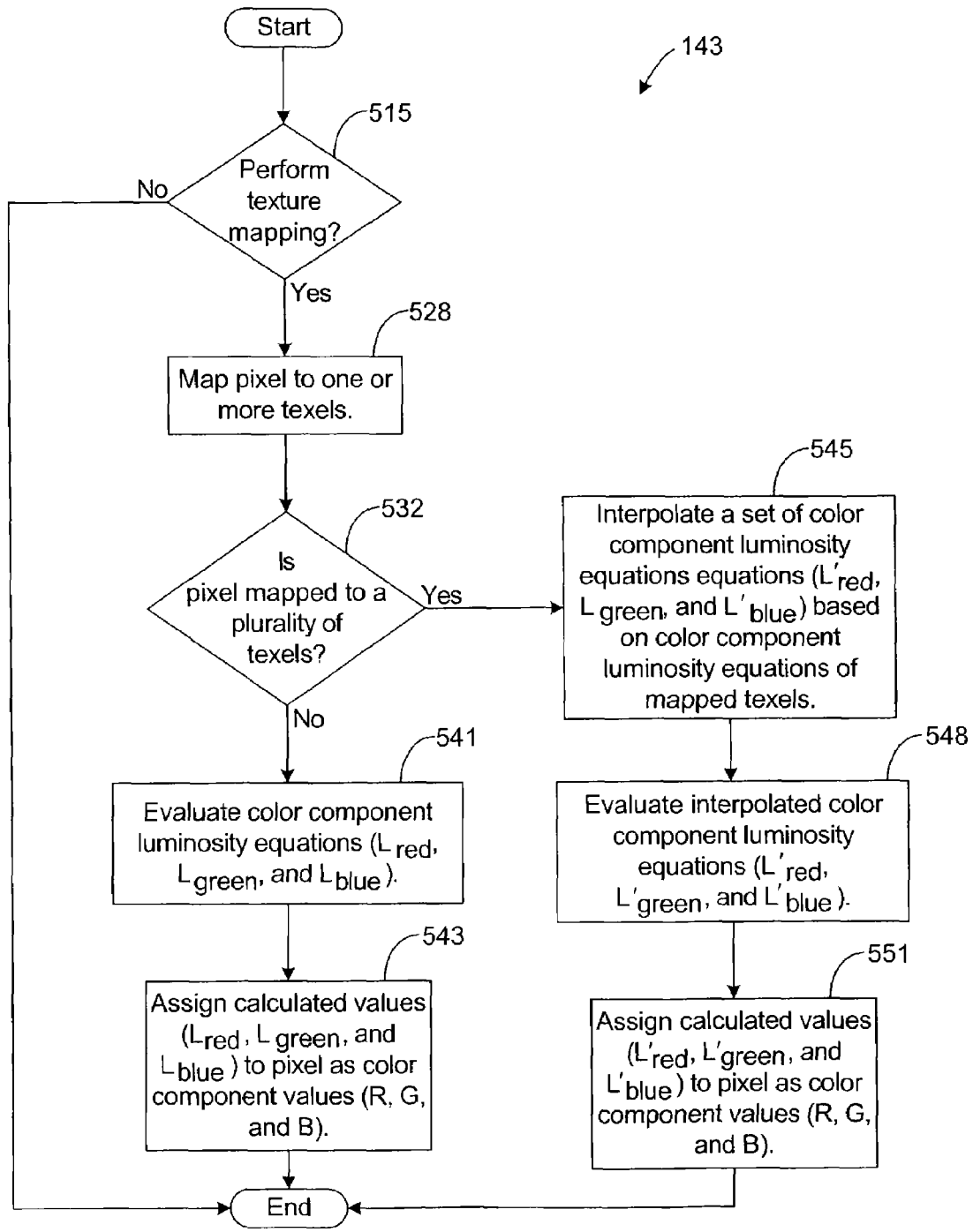
FIG. 15 illustrates a flow chart depicting an exemplary process for performing texture mapping in accordance with an exemplary embodiment of the present invention.

FIG. 15 depicts an exemplary process for applying a PTM 34, such as one generated by the process depicted by FIGS. 13 and 14, that has texels defined by color component luminosity equations ($L_{red}$, $L_{green}$, and $L_{blue}$). When the graphics adapter 142 is rendering a pixel, the texture mapper 143 preferably applies the PTM 34 to the pixel. In this regard, when rendering the pixel, the texture mapper 143 determines, in block 515, whether the pixel defines a portion of a surface of a graphics object, such as the car seat described above. If so, the texture mapper 143 maps one or more texels of the PTM 34 to the pixel, as shown by block 528.

If a single texel is mapped to the pixel, then the mapper 143 evaluates the color component luminosity equations ($L_{red}$, $L_{green}$, and $L_{blue}$) defined by the mapped texel, as shown by blocks 532 and 541. Note that each color component luminosity equation ($L_{red}$, $L_{green}$, and $L_{blue}$) is based on the angle of incidence for the light that illuminates the pixel. As set forth above, this angle of incidence may be determined from the graphics application 141 in order to calculate color component luminosity values ($L_{red}$, $L_{green}$, and $L_{blue}$) from the color component luminosity equations in block 541. After calculating the color component values ($L_{red}$, $L_{green}$, and $L_{blue}$) in block 541, the mapper 143 applies or assigns the calculated color component values ($L_{red}$, $L_{green}$, and $L_{blue}$) to the pixel, as shown by block 543. In this regard, the mapper 143 assigns the color component luminosity value ($L_{red}$) to the pixel as the pixel's red color component value (R). The mapper 143 also assigns the color component luminosity values ($L_{green}$ and $L_{blue}$) to the pixel as the pixel's green and blue color component values (G and B), respectively.

If multiple texels of the PTM 34 are mapped to the pixel in block 528, then the texture mapper 143 is preferably designed to interpolate a new set of color component luminosity equations ($L'_{red}$, $L'_{green}$, and $L'_{blue}$) based on the color component luminosity equations ($L_{red}$, $L_{green}$, and $L_{blue}$) of the mapped texels, as shown by blocks 532 and 545. This may be achieved by interpolating each constant (A', B', C', D', E', and F') of the interpolated equation based on the corresponding constants (A, B, C, D, E, and F) of the corresponding color component luminosity equations ($L_{red}$, $L_{green}$, and $L_{blue}$) of the mapped texels.

For example, to interpolate the constant ($A_{red}$) of the new red color component equation ($L'_{red}$), the texture mapper 143 may calculate a weighted average (weighted based on the pixel's position relative to the mapped texels) of the constant ($A_{red}$) from each red color component luminosity equation ($L_{red}$) of the mapped texels. Furthermore, the other constants ($B'_{red}$, $C'_{red}$, $D'_{red}$, $E'_{red}$, and $F'_{red}$) of the new red color component luminosity equation ($L'_{red}$) may be respectively interpolated, via similar techniques, from the constants ($B_{red}$, $C_{red}$, $D_{red}$, $E_{red}$, and $F_{red}$) of the red color component luminosity equations ($L_{red}$) of the mapped texels.

After interpolating new color component luminosity equations ($L'_{red}$, $L'_{green}$, and $L'_{blue}$) in block 545, the texture mapper 143 preferably evaluates the interpolated color component luminosity equations ($L'_{red}$, $L'_{green}$, and $L'_{blue}$), as shown by block 548. Note that each interpolated color component luminosity equation ($L'_{red}$, $L'_{green}$, and $L'_{blue}$) is based on the angle of incidence for the light that illuminates the pixel. As set forth above, this angle of incidence may be determined from data provided by the graphics application 141 in order to calculate color component luminosity values ($L'_{red}$, $L'_{green}$, and $L'_{blue}$) from the color component luminosity equations in block 548. After calculating the color component values ($L'_{red}$, $L'_{green}$, and $L'_{blue}$) in block 548, the mapper 143 applies or assigns the calculated color component values ($L'_{red}$, $L'_{green}$, and $L'_{blue}$) to the pixel, as shown by block 551.

After color component values are assigned to the pixel in block 543 or 551, the pixel is rendered by the graphics adapter 142. The output device 156 then displays the pixel based on the color component values assigned to the pixel by the texture mapper 143 in block 543 or 551.

To facilitate various graphical rendering techniques, such as tiling, for example, it is generally desirable for a texture defined by a texture map to be oriented in a particular direction. Unfortunately, the texture is not always oriented in a desirable manner upon generation of the texture map. Thus, it may be desirable for the texture to be rotated some desired angle after the texture map has been generated.

To rotate a texture of a conventional texture map, the data defining each texel of the texture map is normally moved from one texel to another texel such that the texture defined by the texture map appears to be rotated by some desired angle when rendered. The foregoing may be achieved by changing the memory locations of the texel color values such that different texel color values are associated with different texel coordinates. Alternatively, the texel color values may be moved to different texels by updating the texel coordinates of each texel such that the texel color values are associated with different texel coordinates. Since the data of a texel is normally a constant color value or a set of color component values, the texel data does not normally change as it is being moved from one texel to another.

However, for PTMs 34, the data of each texel may comprise, in lieu of or in addition to constant color values or color component values, at least one luminosity equation or expression that is a function of light position or some other variable parameter. As described above, such a luminosity equation may comprise information pertaining to the texel's orientation relative to light direction. Moreover, if the texel data of the texels are moved to different texels in an effort to rotate the texture defined by a PTM 34, then each texel's orientation relative to a given light direction changes. Therefore, if a texel's orientation information is not updated when the texture is rotated, then the texel's luminosity equation may less accurately reflect the true luminosity behavior of the texel.

Figure 16:
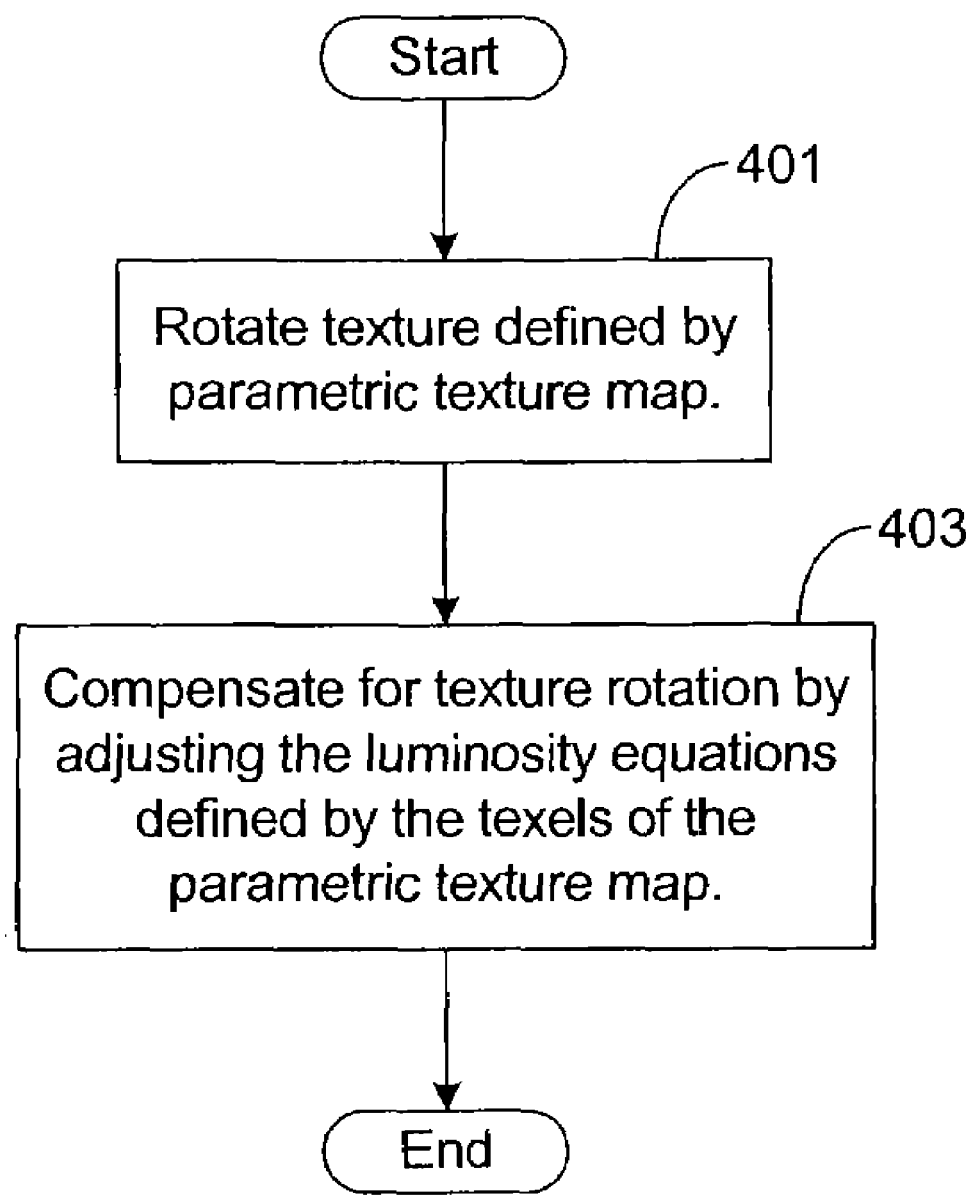
FIG. 16 illustrates a flow chart depicting an exemplary process for rotating a texture defined by a parametric texture map in accordance with an exemplary embodiment of the present invention.

Therefore, in an effort to maintain more accurate luminosity equations, the texture map manager 32 preferably updates the luminosity equations of the PTM 34 when the texture defined by the PTM 34 is rotated, as shown by blocks 401 and 403 of FIG. 16. The following is a description of how luminosity equations may be updated by the texture map manager 32 to account for a rotation, by some angle (x), of the texture defined by the PTM 34.

As previously set forth above, the luminosity equation for a particular texel may be expressed as:

$$L = F(u,v) = Au^2 + Bv^2 + Cuv + Du + Ev + F,$$

where (A, B, C, D, E, and F) are constants and where (u) and (v) are variables representing the angular components of the texel's angle of incidence for light from a light source. Rotating a texel by an angle (+x) implies that the orientation of the texel relative to the light source has changed and that the texel's angle of incidence for light from the light source has, therefore, changed as well. The new luminosity equation (L') can be expressed as a function of the previous luminosity equation (L):

$$L'(u,v) = L(u',v'),$$

where (u',v') represent angular components of the new angle of incidence for the texel. In expanded form, the foregoing equation becomes:

$$A'u^2 + B'v^2 + C'uv + D'u + E'v + F' = A(u')^2 + B(v')^2 + Cu'v' + Du' + Ev' + F.$$

Moreover, u' and v' can be expressed as:

$$u' = \cos(-x)u - \sin(-x)v$$

and $$v' = \sin(-x)u + \cos(-x)v.$$

Let $K = \cos(-x)$, $L = \sin(-x)$, $M = -\sin(-x)$, and $N = \cos(-x)$. Accordingly, u' and v' may be expressed as:

$$u' = Ku + Mv$$

and $$v' = Lu + Nv.$$

Substituting for u' and v' in the expanded equations for L'(u,v) and L(u',v') yields:

$$A'u^2 + B'v^2 + C'uv + D'u + E'v + F' = A(K^2u^2 + M^2v^2 + 2KMuv) + B(L^2u^2 + N^2v^2 + 2LNuv) + C(KLu^2 + KNuv + MLuv + MN^2) + D(Ku + Mv) + E(Lu + Nv) + F.$$

By collecting and associating $u^2$ terms, the following equations can be derived:

$$A' = AK^2 + BL^2 + CKL,$$

$$B' = AM^2 + BN^2 + CMN,$$

$$C' = 2AKM + 2BLN + CKN + CML,$$

$$D' = DK + EL,$$

$$E' = DM + EN,$$

and $$F' = F.$$

Thus, the new luminosity equation for a texel, after rotating the texel by an angle (+x) may be written as:

$$L'(u,v) = F(u,v) = (AK^2 + BL^2 + CKL)u^2 + (AM^2 + BN^2 + CMN)v^2 + (2AKM + 2BLN + CKN + CML)uv + (DK + EL)u + (DM + EN)v + F,$$

where $K = \cos(x)$, $L = \sin(-x)$, $M = -\sin(-x)$, and $N = \cos(-x)$. Note that this equation will be referred to hereafter as the "new luminosity equation."

Thus, when rotating the texture of the PTM 34 by an angle (+x), the texture map manager 32 preferably moves the texel data, including luminosity equations, of the PTM 34 from one texel to another such that each texel is rotated by the angle (+x). The foregoing may be accomplished by changing the memory locations of the luminosity equations such that each equation is associated with a different texel, or the texel coordinates of each texel may be updated such that the same effect is achieved. In moving texel data of one texel to another texel, the texture map manager 32 is preferably configured to change the moved luminosity equation from L(u,v) to L'(u,v) according to the new luminosity equation set forth above in order to compensate for the texture rotation. Thus, the moved equation better represents the luminosity behavior of the new texel as a function of light direction.

Note that similar techniques may be employed to rotate a PTM 34 having texels defined by color component luminosity equations ($L_{red}$, $L_{green}$, and $L_{blue}$). In this regard, when performing texture rotation, the manager 32 is described above as changing a luminosity equation from L(u,v) to L'(u,v). When color component luminosity equations are utilized to define the texels of a PTM 34, the same texture rotation techniques may be employed to change: $L_{red}(u,v)$ to $L'_{red}(u,v)$; $L_{blue}(u,v)$ to $L'_{blue}(u,v)$; and $L_{green}(u,v)$ to $L'_{green}(u,v)$.

As an example, assume that the color component luminosity equations $L_{red}(u,v)$, $L_{blue}(u,v)$, and $L_{green}(u,v)$ are moved from one texel to another texel in order to rotate the texture defined by the PTM 34 by an angle x. If $L_{red}(u,v)$ is expressed as:

$$L_{red}(u,v) = (A_{red})u^2 + (B_{red})v^2 + (C_{red})uv + (D_{red})u + (E_{red})v + F_{red}.$$

then $L'_{red}(u,v)$ may be expressed as:

$$L'_{red}(u,v) = (A_{red}K^2 + B_{red}L^2 + C_{red}KL)u^2 + (A_{red}M^2 + B_{red}N^2 + C_{red}MN)v^2 + (2A_{red}KM + 2B_{red}LN + C_{red}KN + C_{red}ML)uv + (D_{red}K + E_{red}L)u + (D_{red}M + E_{red}N)v + F_{red},$$

where $K = \cos(x)$, $L = \sin(-x)$, $M = -\sin(-x)$, and $N = \cos(-x)$. Further, if $L_{blue}(u,v)$ is expressed as:

$$L_{blue}(u,v) = (A_{blue})u^2 + (B_{blue})v^2 + (C_{blue})uv + (D_{blue})u + (E_{blue})v + F_{blue},$$

then $L'_{blue}(u,v)$ may be expressed as:

$$L'_{blue}(u,v) = (A_{blue}K^2 + B_{blue}L^2 + C_{blue}KL)u^2 + (A_{blue}M^2 + B_{blue}N^2 + C_{blue}MN)v^2 + (2A_{blue}KM + 2B_{blue}LN + C_{blue}KN + C_{blue}ML)uv + (D_{blue}K + E_{blue}L)u + (D_{blue}M + E_{blue}N)v + F_{blue},$$

where $K = \cos(x)$, $L = \sin(-x)$, $M = -\sin(-x)$, and $N = \cos(-x)$. In addition, if $L_{green}(u,v)$ is expressed as:

$$L_{green}(u,v) = (A_{green})u^2 + (B_{green})v^2 + (C_{green})uv + (D_{green})u + (E_{green})v + F_{green},$$

then $L'_{green}(u,v)$ may be expressed as:

$$L'_{green}(u,v) = (A_{green}K^2 + B_{green}L^2 + C_{green}KL)u^2 + (A_{green}M^2 + B_{green}N^2 + C_{green}MN)v^2 + (2A_{green}KM + 2B_{green}LN + C_{green}KN + C_{green}ML)uv + (D_{green}K + E_{green}L)u + (D_{green}M + E_{green}N)v + F_{green},$$

where $K = \cos(x)$, $L = \sin(-x)$, $M = -\sin(-x)$, and $N = \cos(-x)$.

Now, therefore, the following is claimed:

1. A texture mapping system, comprising:
   a processor;
   memory for storing a parametric texture map, the parametric texture map having a plurality of texels defining a first texture, at least one of the texels defining a variable expression that defines a luminosity parameter as a function of light direction; and a texture map manager configured to perform a rotation of the first texture thereby providing a parametric texture map defining a second texture that is rotated relative to the first texture, the texture map manager further configured to define a variable expression for a texel of the parametric texture map defining the second texture by adjusting the variable expression of the one texel to compensate for a change in relative light direction resulting from the rotation.

2. The system of claim 1, wherein the variable expression of the one texel defines a luminosity behavior for the one texel.

3. The system of claim 1, wherein the variable expression of the one texel is defined according to the following equation:

$$F(u,v)=Au^2+Bv^2+Cuv+Du+Ev+F,$$

wherein A, B, C, D, E, and F are constants, and wherein u and v are components of a light vector.

4. The system of claim 3, wherein the texture map manager is configured to adjust the variable expression of the one texel, in response to the rotation, such that the variable expression for the texel of the parametric texture map defining the second texture is defined according to the following equation:

$$F(u,v)=(AK^2+BL^2+CKL)u^2+(AM^2+BN^2+CMN)v^2+(2AKM+2BLN+CKN+CML)uv+(DK+EL)u+(DM+EN)v+F,$$

wherein K=cos(x), L=sin(-x), M=-sin(x), N=cos(-x), and x is indicative of an angle that the parametric texture map is rotated via the rotation.

5. A computer-readable medium encoded with a computer executable program, the program comprising:

logic for rotating a texture defined by a parametric texture map, the parametric texture map having a plurality of texels, at least one of the texels defining a variable expression that defines a luminosity parameter as a function of light direction; and logic for compensating the variable expression of the one texel for a change in relative light direction resulting from a rotation of the texture by the rotating logic, wherein the compensating logic compensates for the change by adjusting the variable expression based on an angle of rotation for the texture to define a new variable expression defining the luminosity parameter for the rotated texture.

6. A texture mapping system, comprising:

means for rotating a texture defined by a parametric texture map using a processor, the parametric texture map having a plurality of texels, at least one of the texels defining a variable expression that defines a luminosity parameter as a function of light direction; and means for compensating the variable expression of the one texel for a change in relative light direction resulting from a rotation of the texture by the rotating means, wherein the compensating means compensates for the change by adjusting the variable expression based on an angle of rotation for the texture to define a new variable expression defining the luminosity parameter for the rotated texture.

7. A texture mapping method, comprising:

rotating a texture defined by a parametric texture map using a processor, the parametric texture map having a plurality of texels, at least one of the texels defining a variable expression that defines a luminosity parameter as a function of light direction; and compensating for a change in relative light direction resulting from the rotating, the compensating comprising adjusting the variable expression of the one texel thereby defining a new variable expression that defines the luminosity parameter for the rotated texture.

8. The method of claim 7, further comprising indicating, via the variable expression of the one texel, a luminosity behavior for the one texel.

9. The method of claim 7, wherein the variable expression of the one texel is defined according to the following equation:

$$F(u,v)=Au^2+Bv^2+Cuv+Du+Ev+F,$$

wherein A, B, C, D, E, and F are constants, and wherein u and v are components of a light vector.

10. The method of claim 9, wherein the new variable expression is defined according to the following equation:

$$F(u,v)=(AK^2+BL^2+CKL)u^2+(AM^2+BN^2+CMN)v^2+(2AKM+2BLN+CKN+CML)uv+(DK+EL)u+(DM+EN)v+F,$$

wherein K=cos(x), L=sin(-x), M=-sin(x), N=cos(-x), and x is indicative of an angle that the texture is rotated via the rotating.

11. The system of claim 7, further comprising:

applying the rotated texture to a graphical object based on the new variable expression; and displaying the graphical object.

12. A texture mapping method, comprising:

rotating a texture defined by a parametric texture map using a processor, the parametric texture map having a plurality of texels, at least one of the texels defining a variable expression that defines a luminosity parameter as a function of light direction; and compensating the variable expression of the one texel for a change in relative light direction resulting from the rotating, wherein the compensating comprises adjusting the variable expression of the one texel based on an angle of rotation of the texture thereby defining a variable expression for a texel that defines a portion of the rotated texture.

13. The method of claim 12, further comprising indicating, via the variable expression of the one texel, a luminosity behavior for the one texel.

14. The method of claim 12, wherein the variable expression of the one texel is defined according to the following equation:

$$F(u,v)=Au^2+Bv^2+Cuv+Du+Ev+F,$$

wherein A, B, C, D, E, and F are constants, and wherein u and v are components of a light vector.

15. The method of claim 14, wherein the variable expression for the texel defining the portion of the second texture is defined according to the following equation:

$$F(u,v)=(AK^2+BL^2+CKL)u^2+(AM^2+BN^2+CMN)v^2+(2AKM+2BLN+CKN+CML)uv+(DK+EL)u+(DM+EN)v+F,$$

wherein K=cos(x), L=sin(-x), M=-sin(x), N=cos(-x), and x is indicative of an angle that the texture is rotated via the rotating.

16. The system of claim 12, further comprising:

applying the rotated texture to a graphical object based on the variable expression for the texel defining the portion of the second texture; and displaying the graphical object.

* * * * *

UNITED STATES PATENT AND TRADEMARK OFFICE
CERTIFICATE OF CORRECTION

PATENT NO. : 7,623,730 B2 Page 1 of 1
APPLICATION NO. : 10/630452
DATED : November 24, 2009
INVENTOR(S) : Bradford A. Ritter et al.

It is certified that error appears in the above-identified patent and that said Letters Patent is hereby corrected as shown below:

In column 20, line 12, in Claim 9, delete "$By^2$" and insert -- $Bv^2$ --, therefor.

In column 20, line 47, in Claim 14, delete "$By^2$" and insert -- $Bv^2$ --, therefor.

Signed and Sealed this

Thirteenth Day of April, 2010

David J. Kappos
*Director of the United States Patent and Trademark Office*